Figure 1:
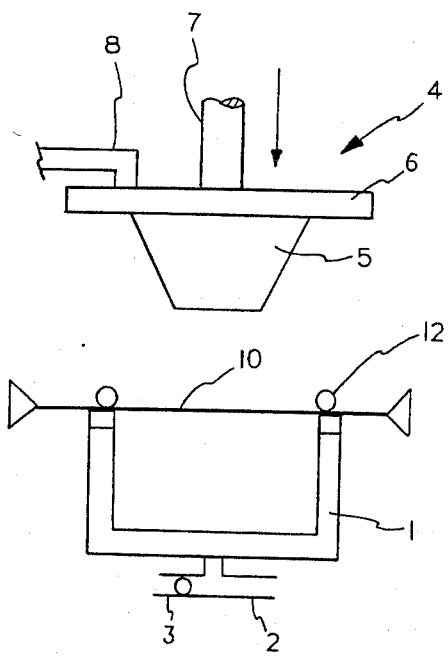
Figure 2:
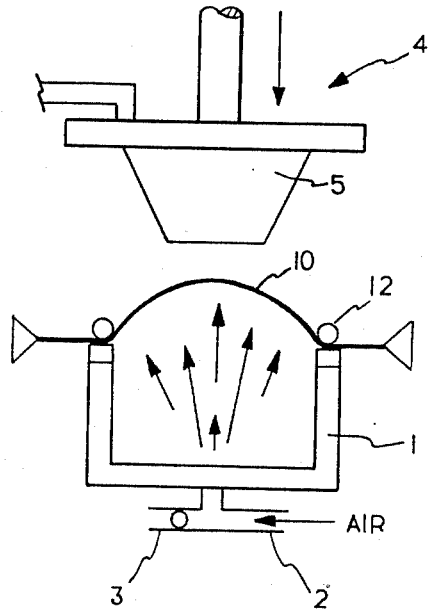

United States Patent [19]

Jabarin

[11] Patent Number: 4,582,665
[45] Date of Patent: * Apr. 15, 1986

[54] METHOD OF MAKING POLY(ETHYLENE TEREPHTHALATE) ARTICLES

[75] Inventor: Saleh A. Jabarin, Holland, Ohio

[73] Assignee: Owens-Illinois, Inc., Toledo, Ohio

[*] Notice: The portion of the term of this patent subsequent to Apr. 23, 2002 has been disclaimed.

[21] Appl. No.: 660,161

[22] Filed: Oct. 12, 1984

Related U.S. Application Data

[63] Continuation-in-part of Ser. No. 601,135, Apr. 20, 1984, abandoned, which is a continuation of Ser. No. 422,784, Sep. 24, 1982, abandoned.

[51] Int. Cl.$^4$ .............................................. B29C 51/06
[52] U.S. Cl. .................... 264/544; 264/522; 264/549; 264/550; 264/553; 264/554
[58] Field of Search .............. 264/520, 521, 523, 526, 264/528, 529, 532, 535, 537, 538, 540, 544, 553, 554, 547, 548, 549, 550, 551, 522

[56] References Cited

U.S. PATENT DOCUMENTS

| | | | |
|---|---|---|---|
| 4,385,089 | 5/1983 | Bonnebat et al. | 264/523 X |
| 4,388,356 | 6/1983 | Hrivnak et al. | 264/549 X |
| 4,512,948 | 4/1985 | Jabarin | 264/521 |

Primary Examiner—Jan H. Silbaugh
Attorney, Agent, or Firm—Philip M. Rice

[57] ABSTRACT

Disclosed is a process of making an oriented and heat set thermoformed hollow article of poly(ethylene terephthalate) so that the sidewalls of the articles resulting from the process have a density over 1.391 cc./gm. and an onset-of-shrinkage temperature over 105° C. In the process, a sheet preheated to a temperature suitable for orientation is biaxially stretch thermoformed and then while the hollow article walls are still in contact with the mold walls, the article is raised to a higher heat setting temperature in the range of about 220–250° C. thus heat setting the article, and while the article is still under restraint resisting shrinkage, quenching the sidewalls of the article to a temperature that will provide a shrinkage of less than about 5% by volume and the above onset-of-shrinkage temperature of at least about 105° C.

9 Claims, 4 Drawing Figures

METHOD OF MAKING POLY(ETHYLENE TEREPHTHALATE) ARTICLES

This application is a continuation-in-part application of my copending application Ser. No. 601,135 filed Apr. 20, 1984, now abandoned, which application is a continuation application of Ser. No. 422,784 filed Sept. 24, 1982, now abandoned.

This application is also related to my copending application Ser. No. 354,473 filed Mar. 3, 1982, now U.S. Pat. No. 4,512,948, and is a continuation-in-part of said Ser. No. 354,473.

This invention relates to improved methods of making hollow, thermoformed biaxially oriented, heat set partially crystalline articles from poly(ethylene terephthalate) sheet.

In order to improve several physical properties of hollow articles made from poly(ethylene terephthalate), it has been suggested that biaxially oriented poly(ethylene terephthalate), hollow articles, made by orientation blow molding of a preform or parison under conditions to provide biaxial orientation and concomitant crystallization, be further heat treated at higher temperatures than the orientation blowing temperature to further increase the density (or crystallinity) of the hollow article. Such increasing of the density or crystallinity by heating after shaping under orientation conditions is commonly known as heat setting.

Wyeth, et al. in U.S. Pat. No. 3,733,309 suggests such a process during blow molding. However, the heat setting process is mentioned only in passing and no specific examples including heat setting are present in the patent. Of course, the extra step would ordinarily add considerable expense to the bottle making process.

Collins in U.S. Pat. No. 4,039,641 discloses heat setting containers of an organic crystallizable synthetic thermoplastic polymeric material. Among such materials disclosed are high density polyethylene, polypropylene homopolymers and copolymers and polyesters such as poly(ethylene terephthalate) and poly(butylene terephthalate), including copolyesters such as ethylene terephthalate/isophthalate copolymers. In a preferred embodiment, heat setting is accomplished by blowing the plastic parison in a heated blow mold, preheated to the heat setting temperature.

It is stated in Collins that the heat setting temperature used is that normally encountered in heat setting of oriented films or fibers made from the given plastic material. It is not stated, however, what heat setting temperatures are "normal" for making oriented films or fibers from poly(ethylene terephthalate). See Collins, infra. However, for this plastic it is disclosed in Collins that the mold is preferably maintained at 130° to 220° C.

It is disclosed in Collins that after heat setting, the container should be cooled down to a temperature, for instance, below about 60° C. In one example of Collins, the heat setting temperature of the mold is 200° C. and in the other, it is 140° C.

In unexamined Japanese Patent Application No. 146,175, laid open Nov. 15, 1980, containers are stretch blow molded under conditions to biaxially orient the polyester molecules. It is explained that as a result of the stretch blow molding, the residual strain was large and that when heated subsequent to the molding, the residual strain was released, causing deformation of the container. To solve this problem, the reference recommends heat setting the containers after blow molding. It is also recommended that the heat setting temperature in unstretched areas such as the neck be held to 95°–125° C. so that hazing will not occur in these areas. Other areas are heat set at a higher temperature. It is recommended that the heat setting of the highly strained areas of the container be in the range from 125° C. to 235° C. However, quenching of the heat set container at 100° C. or above is not disclosed.

Unexamined Japanese Patent Application No. 77,672, laid open June 21, 1979, is similar except that it is not taught to heat set unoriented parts at a lower temperature than other parts. The highest temperature disclosed for heat setting is 130° C. and in the only specific example the oriented blow molded bottle is heat set by contacting with the hot blow mold kept at 130° C. and then lowering the mold temperature to 100° C. to prevent bottle deformation when the bottle is discharged from the mold. In this reference, it is stated that hazing occurs when higher heat setting mold temperatures are used.

In unexamined Japanese Patent Application No. 21,463, laid open Feb. 17, 1979, a blown poly(ethylene terephthalate) bottle was heat set by heating the bottle to 140° C. while still within the blow mold.

In unexamined Japanese Patent Application No. 78,267, laid open June 11, 1978, there is disclosed stretch blow molding a thermoplastic resin, in the example specifically poly(ethylene terephthalate), to make a hollow article, and while the article is still in the mold to introduce hot gases for purposes of heat setting. In the example, the hot gas is at 180° C. The example does not disclose cooling the heat set article before removal from the mold, but the description of the drawing does describe this as an alternative treatment, using normal temperature compressed gas to cool the molded piece.

In unexamined Japanese Patent Application No. 66,968, laid open May 29, 1979, methods of reducing residual strain in biaxially oriented blown bottles are disclosed. The methods are applied to unidentified, saturated polyester resins. In all of the methods the bottle is heated, after being formed by biaxial orientation blow molding by one method or another. After the heat treatment the bottle is cooled, but the temperature to which the bottle is cooled is not disclosed. The heating step apparently includes heating the neck portion of the bottle, since in one method the heating is by passing steam through channels 8 which include channels 8 next to the neck, and in another method heating is carried out by high temperature pressurization of the interior of the bottle, which of course includes the neck.

In unexamined Japanese Patent Application No. 78,268, laid open June 11, 1978, a stretch blow molded hollow body, including those made from poly(ethylene terephthalate) is heat set by introducing hot gas under pressure into the interior of the bottle while in the mold. After the heat setting, normal temperature gas can be optionally blown into the article to cool the article before removal from the mold, or the heat set body can simply be exhausted to atmospheric. In an example, the heated gas for heat setting is at 200° C. In the specific example, no cooling before removal from the mold was disclosed. Again, the heating includes heating of the neck portion of the bottle.

In unexamined Japanese Patent Application No. 41,973, laid open Apr. 3, 1979, it is disclosed to heat set stretch blow molded containers, including those made from poly(ethylene terephthalate) by heating the blown containers at a high temperature and then rapidly cooling them to room temperature. Heat treatment can be within the mold while under pressure and the heating can be by means of a hot mold. It is disclosed that the heat treatment should be such that the density of the bottle body following the heat treatment is no greater than 1.40 gms./cc. In the example given, steam at 179° C. is used for heating the mold in the heating step.

Scarlett U.S. Pat. No. 2,823,421 discloses heat setting of PET films using heat setting temperatures of 150°–250° C. after orientation stretching. This patent does not state, however, what "normal" PET film heat setting temperatures are. It does disclose that for a film stretched three times in each direction that a heat setting temperature of 200° C. is preferred by Scarlett.

German U.S. Pat. No. 2,540,930 discloses heat setting of hollow articles. The blank or parison is blow molded at 70°–140° C. and then cooled in the mold to below 70° C. Thereafter, the bottle can be reheated to heat setting temperature in that mold or in a different mold. The heat setting temperature is said to be over 140° C. or higher. In the disclosed process the entire bottle including the neck is heated in the heat setting step to the same temperature and the neck of the bottle crystallizes to an opaque state.

In Brady, et al. U.S. Pat. No. 4,233,022 a bottle oriented by blow molding PET at 75°–100° C. is heat set. Heat setting is accomplished in a hot mold at a suitable heat setting temperature; examples of such temperatures are given as 150° to 220° C. The patent features controlling different zones of the bottle at different temperatures, so that all the sidewall of the bottle is at the maximum heat setting temperatures being used, but the finish or neck, for instance, is actually cooled to prevent crystallization thereof. In this patent after the heat setting step, it is stated that the bottle is cooled to a self-sustaining condition.

The present invention relates to a process of stretch thermoforming under orientation temperature conditions to form a hollow article followed by heat setting the hollow article at heat setting temperatures of 200°–250° C., as is described in more detail hereafter.

In U.S. Pat. No. 4,127,631 dated Nov. 18, 1978, there is described the heat-setting of a hollow thermoformed article at a maximum temperature of about 177° C. (350° F.). In particular, the sheet is expanded or stretched into contact with a mold which has been preheated to the heat-setting temperature disclosed in the patent. Also, the heat-set hollow article was removed from the mold at heat-setting temperature and allowed to cool to room temperature in air.

In U.S. Pat. No. 3,960,807 dated June 1, 1976, there is disclosed the heat setting of thermoformed articles made from a PET composition at a heat setting temperature of up to 190° C. while under restraint. The extent of cooling the heat set polymer, if any, while in the mold is not given.

In U.S. Pat. No. 3,496,143 dated Feb. 17, 1970, there is disclosed thermoforming a PET sheet having at least 5 percent crystallinity by vacuum deep drawing at a temperature of 85° to 200° C., wherein the shaped article is heat treated at a temperature of from 140° to 220° C. It is then removed from the mold and cooled or cooled and then removed from the mold. However, there is no disclosure of cooling in the mold while under restraint to a minimum temperature of 100° C. and then removing the restraint before further cooling.

Finally, in U.S. Pat. No. 3,830,616 dated Aug. 20, 1974, there is disclosed thermoforming a polyester and then raising the temperature to 450° F. after thermoforming, in one example taking 30 to 38 seconds to reach this temperature, followed by holding that temperature for 12 seconds, and then cooling the mold over a period of about 30 seconds. The cooling of the mold is presumably to somewhere in the neighborhood of ambient temperature since the temperature to which the article is cooled is not specified at all. From the description at column 6, lines 15–23, it appears that the temperature of thermoforming is just below the 450° F., which would mean that the polyester would not become oriented during thermoforming since it is too hot.

In this application, the term "thermoforming" means any process of forming thermoplastic sheet which consists of heating the sheet and pulling it down onto a mold surface. The term "stretch termoforming" means a thermoformning process in which the sheet during forming is stretched so that it becomes thinner and of a larger overall area. The term "orientation temperature" means a temperature in the range in which the thermoplastic undergoes orientation while stretch thermoforming. The temperature range usually used in the method of the present invention for orientation is in the range from 80° C. to 120° C. Higher temperatures are also conducive to orientation if the stretching is effected at a fast enough rate, as will be understood by those skilled in the art.

In one embodiment the present process features biaxially orientating during stretch thermoforming of a poly(ethylene terephthalate) sheet, which has been preheated to orientation temperature, to form a final hollow article against a male or female mold wall surface, and heat setting by contacting said article with said mold wall which is at a higher, heat setting temperature, holding the hollow article against the mold wall for the short time necessary to effect the heat setting. This embodiment also features thereafter cooling the heat set hollow article while under stress or restraint preventing shrinkage, to a lower temperature $T_q$ not below 100° C., and then removing the stress or restraint from the hollow article before further cooling of the article below $T_q$ takes place.

The prior art merely discloses that a heat set bottle needs to be cooled to a self-sustaining condition or it discloses that it must be cooled to some specific temperature which is obviously very low and at which such bottles are self-sustaining.

For instance, Collins U.S. Pat. No. 4,039,641 specifically discloses cooling to below 60° C. and in one specific example cools to 40° C., before releasing the gas pressure in a blown bottle. On the other hand, the before mentioned U.S. Pat. No. 4,127,631 removes all restrain on the thermoformed and heat set article while it is still at heat setting temperature.

I have found that the "onset-of-shrinkage" temperature for the heat set sidewall of the thermoformed poly(ethylene terephthalate) hollow articles or containers of the invention depends on the density of the wall and the temperature to which the hollow article is cooled before the stress is removed.

The onset-of-shrinkage temperature referred to herein is as described in Brady and Jabarin "Thermal Treatment of Cold-Formed Poly(Vinyl Chloride) Polymer Engineering and Science", pp. 686–90 of Vol. 17, No. 9, September, 1977, except that the samples are cut from the sidewalls of the hollow articles. No thermal treatment is effected on the cut samples prior to the determining the onset-of-shrinkage temperature.

Ordinarily, after a thermoformed PET article is formed, it is cooled to quite a low temperature before removal from the mold, a temperature very much below the temperature at which the article would be self-sustaining, in fact much below the temperature at which the article will shrink at all when the restraint is removed. According to an important feature of the present invention, I cool the heat set hollow article, while still under stress or restraint preventing shrinkage, to a temperature which will allow the volume of the hollow article to shrink no more than 6, preferably 5, percent, when the stress is removed and the article is allowed to cool to room temperature, but no lower than 100° C., before releasing the stress. I have discovered that cooling while the walls are under stress, i.e. when not allowing shrinkage, below 100° C. progressively reduces the onset-of-shrinkage temperature even when the final room temperature volume remains the same and does not decrease with decreasing "quench" temperature. Thus, the volume remains essentially constant for quench temperatures of 90° C. and below but the onset-of-shrinkage temperature becomes progressively lower. It has also been found that the trend continues at quench temperatures above 100° C., i.e. that the onset-of-shrinkage temperature increases as the quench temperature increases above 100° C.

One advantage of the present process is that a great decrease in cycle time is obtained in my heat setting process, because the article is left in contact with the wall only for the time necessary to cool it to the relatively high temperature range before indicated, so that the next cycle can be immediately started.

The process of the present invention, as well as the product, is concerned with polymers of poly(ethylene terephthalate), known as PET, having an inherent viscosity of at least 0.6. Poly(ethylene terephthalate) polymers useful in the present invention include polymers where at least 97% of the polymer contains the repeating ethylene terephthalate units of the formula:

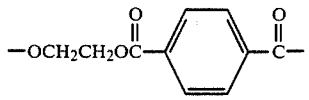

with the remainder being minor amounts of ester-forming components, and copolymers of ethylene terephthalate wherein up to about 10 mole percent of the copolymer is prepared from the monomer units selected from butane-1,4-diol; diethylene glycol; propane-1,3-diol; poly(tetramethylene glycol); poly(ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in samll amounts in order to increase the melt strength of the poly(ethylene terephthalate).

As used herein and in the claims, the poly(ethylene terephthalate) sheet can mean a sheet made entirely of that material or it can be a multilayered thermoplastic sheet wherein one of the layers is poly(ethylene terephthalate). Of course, the other layers will be thermoplastic or thermoelastic at the temperature of stretch thermoforming chosen to fit the orientation temperature range of the PET layer.

It is an object of the present invention to provide an improved manipulative process for producing poly(ethylene terephthalate) hollow articles from PET sheet which articles are biaxially oriented, heat set and highly crystalline as indicated by density, which process results in a maximum effciency of production.

It is another object of my invention to provide a process for producing a poly(ethylene terephthalate) hollow article having superior oxygen and carbon dioxide permeability properties and having increased thermal stability (high onset-of-shrinkage temperature). The highly crystalline nature of such heat set hollow articles and the permeability properties are directly related to their density, so that the products of the present process have high densities and consequently low permeabilities coupled with higher onset-of-shrinkage temperatures not known for heat set poly(ethylene terephthalate) hollow articles before my invention.

Other object, as well as aspects and advantages, of the present invention will become apparent from a study of the specification.

In one of its broadest aspects, the process of the invention comprises (1) biaxially orienting the body of a poly(ethylene terephthalate) article by biaxially stretch thermoforming poly(ethylene terephthalate) sheet preheated to a temperature range conducive to orientation to form a hollow biaxially oriented hollow article, (2) while said article is still under restraint sufficient to maintain its essential size and shape, heating to a second, higher temperature in the range 200° to 250° C. the portions thereof it is desired to crystallize, thereby increasing the density of such portions, and (3) while said article is still under shrinkage-resistant restraint sufficient to maintain its essential size and shape, cooling said article to a third temperature which it maintains its shape even without such restraint but not below 100° C., and (4) thereafter removing said restraint from the hollow article while at said third temperature, and (5) effecting further cooling below said third temperature without said restraint.

Ordinarily, said further cooling is to approximately ambient temperature and is in any event below 80° C. Steps (3) and (4) result in a heat set article having a higher "onset-of-shrinkage" temperature than if all cooling or quenching be done down to ambient temperature while the walls of the article are under said shrinkage resistant restraint or stress.

According to an important aspect of the present invention I have provided a method of making a high density, partially crystalline, biaxially oriented hollow poly(ethylene terephthalate) plastic article from a sheet of said plastic by stretch termoforming comprising (1) heating a sheet of said plastic to a first temperature range, which first temperature range is conducive to orientation during stretch thermoforming thereof, (2) while said sheet is still at said first temperature range stretch thermoforming said sheet into contact and conformance with either a male or female mold wall to make a hollow article, said stretch thermoforming under the resulting strain conditions resulting in biaxial orientation and cocomitant partial crystallization of said poly(ethylene terephthalate), and then (3) while the article walls are still under shrinkage-resistant restraint and in contact with said mold wall, raising the temperature of the article to a higher second temperature in the range 200° to 250° C., (4) wherein the heating in said second temperature range heat sets the body of said article by causing further crystallization thereof as indicated by density increase, (5) and while said hollow article is still under shrinkage-resisting restraint, cooling said article to a third temperature at which it maintains its shape when not under such restraint but not below 100° C., (6) thereafter removing said shrinkage-resistant restraint while at said third temperature, (7) further cooling said hollow article.

Ordinarily most, of all, of the incremental heat to raise the article wall to the heat setting temperature range of 200° to 250° C. comes from contacting the article wall with the hot thermoforming mold surface which is in said temperature range.

The present process of orientation thermoforming and heat setting not only produces articles with increased density (crystallinity), with the known decrease in oxygen and carbon dioxide permeabilities but it also has the following advantages over the prior art theremoforming and heat setting:

(1) increased productivity rate because of decreased cycle time, (2) compared to prior art heat set PET hollow articles, higher onset-of-shrinkage temperatures, important for hot-fill packaging of fluid or melted products, and (3) energy savings because of lack of necessity to repeatedly cool the mold to low temperatures each cycle.

It is emphasized that I have discovered, surprisingly, that the onset-of-shrinkage temperature (for a given density oriented and heat set hollow article) becomes lower as the quench temperature, while under restraint, becomes lower, even when the volume stays constant. Thus, I have discovered that higher quench temperatures, where the quenching takes place while the hollow article is restrained against shrinkage, give higher onset-of-shrinkage temperatures. The heat set PET walls of the products of the present process have densities of at least 1.380 at room temperature and an onset-of-shrinkage temperature of over 80° C. Heat setting times are such that this density is realized. This can take from as little as 1 second at the higher temperatures up to perhaps 10 or 15 seconds at 200° C.; longer times can of course be used.

In the drawings, FIGS. 1 through 4 illustrate one form of apparatus and procedure useful in the process of the present invention.

In the figures, 1 is the female mold in which the thermoplastic sheet is shaped to form the hollow article. Conduits 2 and 3 are, respectively, for introduction of pressurized air and means for exhausting air to create a vacuum. Assembly 4 consists of plug 5, cover 6, drive means 7 and pressurizing air inlet 8. The plastic sheet in various stages is depicted as 10, except in FIG. 4 the plastic is shown as hollow article 11. The annular sealing ring is depicted as 12.

In a typical operation, a PET sheet having an inherent viscosity of 0.8 and a density at 25° C. of about 1.34 which has been preheated to 95° C. is sealed across the female cavity as shown in FIG. 1. Meanwhile plug 5 has been preheated to about 95° C. by circulating heat exchange fluid through internal heat exchange bores in the plug (not shown).

Figure 3:
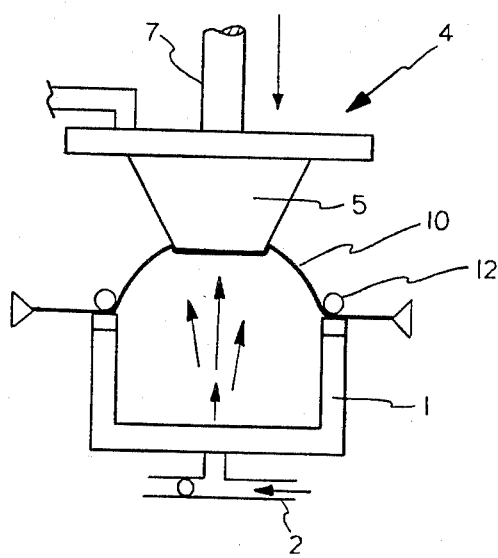
Figure 4:
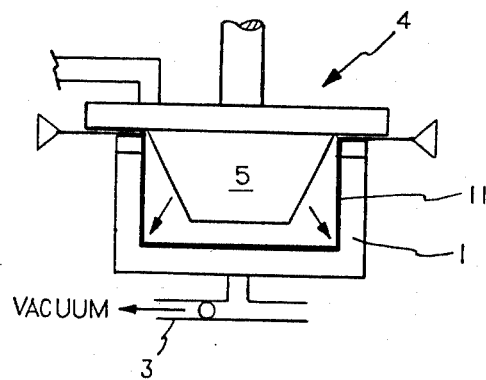

Next, pressurized air is introduced into the mold cavity 1 through conduit 2 and blows the sheet upwardly into a bubble. Then by means of actuator 7 plug 5 is plunged downwardly into the plastic bubble as shown in FIG. 3 and on downwardly until it reaches the sealling position shown in FIG. 4; in FIG. 4 the air is being evacuated to conduit 3 while pressurizing air is being introduced to the inside of the container 11 being formed, thus completing the stretch thermoforming. In this illustration, mold 1 has already been preheated before the starting of the molding cycle to the heat setting temperature of 235° C. After the hollow container 11 has been fully formed as shown in FIG. 4, it is held against the hot wall of mold 1 for two seconds.

Mold 1 contains internal heat exchange bores which have been used to preheat the mold to 235° C. by meas of hot oil. After a two second heating period the flowing hot oil is replaced by cooler hot oil having a temperature of 160° C. After six seconds of cooling article 11, the internal air pressure is released and the cover 6 removed and the hollow article removed and allowed to cool to room temperature under ambient conditions.

It will be seen that the stretch blow molding was carried out under orientation conditions. In the foregoing example, the dimensions are such that the areal stretching was at a ratio of 4. In other words, the stretched area of the sheet is 4 times the unstretched area so that the average thickness is one-fourth the original thickness. Under the orientation stretching conditions some appreciable crystallization takes place during the orientation thermoforming. During the heat setting step, considerably more crystallization is effected because the polymer is under stress and is oriented and, as is well known, crystallization is effected quite rapidly under such conditions.

Under the conditions of the example given, the onset of shrinkage temperature is typically above 150° C. On the other hand when the foregoing example is repeated except that the cooling to room temperature is done as in FIG. 4, while the air pressure is still applied, the onset-of-shrinkage temperature is typically below 80° C.

The orientation stretch thermoforming of the present invention can be carried out in any stretch thermoforming apparatus that will allow appreciable orientation to take place. For instance, matched mold thermoforming is not particularly satisfactory since much of the container would not be oriented to any appreciable extent at all. Also, while straight vacuum thermoforming can be practiced on very thin sheets, it is generally preferable to combine this technique with a plug assist.

Thermoforming techniques are discussed in Modern Plastics Encyclopedia, 1980-81, pages 406 through 414. Techniques especially applicable are those shown in FIGS. 4, 5, 7 and 8. However, in FIG. 7 somewhat less orientation is effected in the bottom of the hollow article than in the sides.

Thermoforming starting with "scrapless sheet" can be practiced according to the present invention. This type of process is shown in U.S. Pat. No. 3,739,052 where in FIG. 7 pressure thermoforming is shown. For the present process conduits 52 are used to heat the female mold to about the heat setting temperature, and later to adjust its temperature to about the quench temperature of no less than 100° C. Also, plug assist can be added in such a process if desired.

When inherent viscosity is referred to herein, it is the viscosity as measured in a 60/40 weight ratio phenol/tetrachoroethane solution at 25° C. Density is that determined by the method described in ASTM 1505, entitled "Density Gradient Technique."

In the present invention, the oriented PET container with the oriented sidewalls can be prepared by thermoforming or by blow molding, an important consideration being the providing of an oriented sidewall that can be properly heat set and quenched. As stated in my copending application Ser. No. 354,473 filed Mar. 3, 1982 (Docket 15278) and assigned to the same assignee as the present application, I have discovered that the high onset-of-shrinkage temperature for the heat set sidewall of the blow molded or thermoformed PET hollow articles depends on the density of the sidewall and the temperature to which the hollow article is cooled before the stress is removed. This discovery is set forth in my copending application Ser. No. 601,135 (Docket 15531-01) on page 8, lines 8–12 and this discovery was previously set forth in this application.

Hence, the present invention provides a method for making a high density, partially crystalline, biaxially oriented, heat set, PET hollow container, the container having a body with an oriented sidewall, the method comprising the steps of:

(A) providing by thermoforming a hollow container with oriented sidewalls;

(B) while restraining the article to its essential size and shape, increasing the density of the oriented sidewalls to at least about 1.391 g/cc by heating the sidewalls to a heat setting temperature equivalent to a temperature of about 220° C. to 250° C. to provide the density of about 1.391 g/cc; and (C) quenching the sidewalls while still under a shrinkage reducing restraint to provide the article with a shrinkage of less than about 5% of the volume and an onset-of-shrinkage temperature of at least about 105° C., the quenching being done at a temperature equivalent to that of about room temperature to 180° C. at a higher heat setting temperature of about 240° C., about 85° C. to 160° C. for a heat setting temperature of about 230° C., and about 120° C. to 150° C. for a lower heat setting temperature of about 220° C.

The details of the minimum heat setting density of at least about 1.391 g/cc and the quench temperature are found in my copending application Ser. No. 354,473, the same criterion for blow molded containers being good for thermoformed containers. The disclosure of Ser. No. 354,473 appears, for instance, on pages which are repeated hereinafter.

In the Examples summarized in Tables 1 and 2, the bottles were all well-shaped unless indicated as "deformed", also, the nominal overflow volume of the bottles with no shrinkage is about 522 cc.

TABLE 1

| Heat Setting °C. | Sec. | Quench Temp. °C. | Density[1] gm./cc. | Volume 2 min.[2] cubic centimeters | Volume 24 hrs. cubic centimeters | Onset Temp. °C. |
|---|---|---|---|---|---|---|
| 250 | 30 | 148 | 1.4013 | | | |
| 250 | 120 | 148 | 1.4022 | | | |
| 240 | 6 | 180 | 1.3980 | 497.9 | 497.4 | |
| 240 | 6 | 170 | 1.3980 | 501.9 | 501.6 | |
| 240 | 6 | 160 | 1.3980 | 506.2 | 506.1 | 184 |
| 240 | 6 | 150 | 1.3980 | 509.3 | 509.2 | |
| 240 | 6 | 130 | 1.3978 | 513.9 | 514 | 172 |
| 240 | 6 | 120 | 1.3978 | 516.1 | 515.9 | 168 |
| 240 | 6 | 110 | 1.3978 | 518.5 | 518.4 | — |
| 240 | 6 | 100 | 1.3965 | 519.4 | 519.7 | 154 |
| 240 | 6 | 90 | 1.3970 | 520.8 | 520.9 | 143 |
| 240 | 6 | 80 | 1.3986 | 521.7 | 521.7 | 139 |
| 240 | 6 | 80 | 1.3982 | none[3] | 521.8 | — |
| 240 | 6 | 60 | 1.3982 | 521.8 | 522.1 | 132 |
| 230 | 6 | 170 | 1.3950 | 493.1 | 493.6 | — |
| 230 | 6 | 160 | 1.3950 | 499.5 | 498.8 | 168 |
| 230 | 6 | 150 | 1.3950 | 504.1 | 503.8 | — |
| 230 | 6 | 140 | 1.3950 | 509.0 | 508.6 | |
| 230 | 6 | 129 | 1.3950 | 512 | 511.6 | 148 |
| 230 | 6 | 124 | 1.3947 | 514.1 | 513.7 | 138 |
| 230 | 6 | 100 | 1.3947 | 520.7 | 519.8 | 120 |
| 230 | 6 | 85 | 1.3945 | 521.1 | 520.6 | 113 |
| 230 | 6 | 75 | 1.3945 | 521.4 | 520.9 | 104 |
| 230 | 6 | 60 | 1.3950 | 521.8 | 521.8 | 88 |

[1]at mid-sidewall
[2]overflow volume measured by filling with room temperature water 2 minutes after opening mold.
[3]allowed to cool 24 hours in air without filling with water until then.

TABLE 2

| Heat Setting °C. | Sec. | Quench Temp. °C. | Density[1] gm./cc. | Volume 2 min.[2] cubic centimeters | Volume 24 hrs. cubic centimeters | Onset Temp. °C. | |
|---|---|---|---|---|---|---|---|
| 220 | 6 | 160 | 1.3912 | Deformed | | | |
| 220 | 6 | 150 | 1.3928 | 500.9 | 500.7 | | |
| 220 | 6 | 140 | 1.3910 | 502.9 | 502.9 | | |
| 220 | 6 | 135 | 1.3912 | 506.0 | 505.8 | 114 | |
| 220 | 6 | 120 | 1.3914 | 513.9 | 513.6 | 108 | |
| 220 | 6 | 110 | 1.3918 | 517.5 | 517.4 | 100 | |
| 220 | 6 | 100 | 1.3918 | 519.8 | 519.5 | 94 | |
| 220 | 6 | 90 | 1.3923 | 520.5 | 520.5 | 88 | |
| 220 | 6 | 80 | 1.3919 | 521.2 | 521.4 | 83 | |
| 220 | 6 | 60 | 1.3922 | 521.5 | 521.5 | 76 | |
| 200 | 6 | 140 | 1.3867 | Deformed | | | |
| 200 | 6 | 130 | 1.3867 | 496.5 | 495.7 | 102 | |
| 200 | 6 | 115 | 1.3868 | 513.0 | 513.0 | 95 | |
| 200 | 6 | 100 | 1.3877 | 519.9 | 519.8 | 84 | |
| 200 | 6 | 90 | 1.3870 | 519.9 | 520.0 | 80 | |
| 200 | 6 | 80 | 1.3860 | 520.8 | 520.4 | 78 | |
| 200 | 6 | 60 | 1.3872 | 521.0 | 520.9 | 74 | |
| 130 | 6 | 100 | 1.3702 | 509 | 508.4 | 74 | (Deformed) |
| 130 | 120 | 100 | 1.3744 | 512.2 | 511.7 | 74 | (Deformed) |

[1]at mid-sidewall
[2]overflow volume measured by filling with room temperature water 2 minutes after opening mold
[3]allowed to cool 24 hours in air without filling with water until then The last two examples are a repetition of the example in Jap. No. 77,672, infra. The bottles were misshapen, i.e., they were completely out of round, and of course, they have lower onset temperatures and the densities are lower than the products of the invention.

The bottles made at 250° C. heat setting temperature were made of 0.9 inherent viscosity PET.

From the results shown in Tables 1 and 2 it will be seen that I have discovered, surprisingly, that the onset-of-shrinkage temperature (for a given density oriented and heat set hollow article) becomes lower as the quench temperature becomes lower, even when the volume stays constant. Thus, I have discovered that higher quench temperatures, where the quenching takes place while the hollow article is restrained against shrinkage, gives higher onset-of-shrinkage temperatures.

What is claimed is:

1. A method for making a high density, partially crystalline, oriented, heat set, thermoformed polyethylene terephthalate hollow container, the container having a body with oriented sidewalls, the method comprising the steps of:
    A. providing by thermoforming a hollow container with oriented sidewalls;
    B. while the container is under restraint to maintain its essential size and shape, increasing the density of the oriented sidewalls to at least about 1.391 g/cc by heating the sidewalls to a heat setting temperature equivalent to a temperature of about 220° C. to 250° C. to provide the density of at least about 1.391 g/cc; and
    C. quenching the sidewalls while under a shrinkage reducing restraint to provide the article with a shrinkage of less than about 5% of the volume and an onset-of-shrinkage temperature of at least about 105° C., the quenching being done at a temperature equivalent to that of about room temperature to 180° C. at a high heat setting temperature of about 240° C., about 85° C. to 160° C. for a heat setting temperature of about 230° C., and about 120° C. to 150° C. for a heat setting temperature of about 220° C.

2. A method as defined in claim 1 in which the heat setting temperature is about 225° to 250° C. and the increased density of the sidewalls is about 1.393 g/cc.

3. A method as defined in claim 1 in which the heat setting temperature is about 230° C. and the quenching temperature is about 100° C.

4. A process which comprises
    A. biaxially orienting the body of a poly(ethylene terephthalate) hollow article by biaxially stretch thermoforming poly(ethylene terephthalate) sheet preheated to a suitable orientation temperature range to form a hollow biaxially oriented hollow article;
    B. while the container is under restraint to maintain its essential size and shape, increasing the density of the oriented sidewalls to at least about 1.391 g/cc by heating the sidewalls to a heat setting temperature equivalent to a temperature of about 220° C. to 250° C. to provide the density of at least about 1.391 g/cc;
    C. quenching the sidewalls while under a shrinkage reducing restraint to provide the article with a shrinkage of less than about 5% of the volume and an onset-of-shrinkage temperature of at least about 105° C., the quenching being done at a temperature equivalent to that of about room temperature to 180° C. at a high heat setting temperature of about 240° C., about 85° C. to 160° C. for a heat setting temperature of about 230° C., and about 120° C. to 150° C. for a heat setting temperature of about 220° C.;
    D. thereafter removing said restraint from the hollow article; and
    E. effecting further cooling of the hollow article without said restraint.

5. A process of claim 4 wherein said second temperature range is achieved at least in part by contacting said hollow article with a hot mold wall which is at said second temperature range.

6. A process as defined in claim 4 for forming a biaxially oriented and heat set hollow article from poly(ethylene terephthalate) sheet which comprises biaxially stretch thermoforming said sheet which has been preheated to an orientation temperature range to form a final hollow article against a male or a female mold wall surface, and heat setting while said article is under stress or restraint preventing shrinkage, by contacting said article with said mold wall which is at a higher heat setting temperature of about 220° to 250° C.

7. A process of claim 4 wherein said quenching is at about 100° C. and the heat setting temperature is about 230° C.

8. A process of claim 4 wherein said mold wall surface is at said temperature range of about 220° to 250° C. when said hollow article wall first contacts it during thermoforming.

9. A method of making a high density, partially crystalline, biaxially oriented hollow poly(ethylene terephthalate) plastic article from a sheet of said plastic by stretch thermoforming comprising
    A. heating a sheet of said plastic to a first temperature range, which first temperature range is conducive to orientation during stretch thermoforming thereof;
    B. while said sheet is still at said first temperature range stretch thermoforming said sheet into contact and conformance with either a male or female mold wall surface to make a hollow article, said stretch thermoforming under the resulting strain conditions resulting in biaxial orientation and concomitant partial crystallization of said poly(ethylene terephthalate); and then
    C. while the container is under restraint to maintain its essential size and shape, increasing the density of the oriented sidewalls to at least about 1.391 g/cc by heating the sidewalls to a heat setting temperature equivalent to a temperature of about 220° C. to 250° C. to provide the density of at least about 1.391 g/cc; and
    D. quenching the sidewalls while under a shrinkage reducing restraint to provide the article with a shrinkage of less than about 5% of the volume and an onset-of-shrinkage temperature of at least about 105° C., the quenching being done at a temperature equivalent to that of about room temperature to 180° C. at a high heat setting temperature of about 240° C., about 85° C. to 160° C. for a heat setting temperature of about 230° C., and about 120° C. to 150° C. for a heat setting temperature of about 220° C.

* * * * *